US008625124B2

(12) United States Patent
Murakami et al.

(10) Patent No.: US 8,625,124 B2
(45) Date of Patent: Jan. 7, 2014

(54) IMAGE FORMING DEVICE CAPABLE OF TRANSMITTING DOCUMENT TO ANOTHER DEVICE

(75) Inventors: Masakazu Murakami, Itami (JP); Mitsuzo Iwaki, Osaki (JP); Tomonari Yoshimura, Kyoto (JP); Okihisa Yoshida, Amagasaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1793 days.

(21) Appl. No.: 11/594,727

(22) Filed: Nov. 9, 2006

(65) Prior Publication Data

US 2008/0007755 A1 Jan. 10, 2008

(30) Foreign Application Priority Data

Jul. 6, 2006 (JP) ................................ 2006-187015

(51) Int. Cl.
*G06F 3/12* (2006.01)

(52) U.S. Cl.
USPC .......... 358/1.15; 358/1.1; 358/1.14; 358/1.13

(58) Field of Classification Search
USPC ........................................ 358/1.1, 1.13, 1.15
See application file for complete search history.

(56) References Cited

U.S. PATENT DOCUMENTS 6,351,763 B1 * 2/2002 Kawanaka .................... 709/206
7,356,564 B2 * 4/2008 Hartselle et al. .............. 709/206

FOREIGN PATENT DOCUMENTS

| | | | |
|---|---|---|---|
| JP | 10-136010 | 5/1998 | |
| JP | 11-74928 | 3/1999 | |
| JP | 11074928 | * 3/1999 | ............. H04L 12/54 |
| JP | 11-177616 | 7/1999 | |
| JP | 11-306062 | 11/1999 | |
| JP | 11-321046 | 11/1999 | |
| JP | 2000-330737 | 11/2000 | |
| JP | 2003-323276 | 11/2003 | |
| JP | 2003-330664 | 11/2003 | |
| JP | 2003330664 | * 11/2003 | ................ G06F 3/12 |

OTHER PUBLICATIONS

Japanese Notice of Grounds of Rejection mailed Jul. 1, 2008 directed towards counterpart foreign application No. 2006-187015; 4 pages.

* cited by examiner

*Primary Examiner* — King Poon
*Assistant Examiner* — Iriana Cruz
(74) *Attorney, Agent, or Firm* — Morrison & Foerster LLP

(57) ABSTRACT

An MFP (A) on a document transmission side transmits a document to an MFP (B) on a document reception side. The MFP (A) stores the transmitted document. The MFP (A) acquires a status of the transmitted document from the MFP (B). If the MFP (B) deletes the document in an unread state, the MFP (A) retransmits the stored document to the MFP (B).

14 Claims, 9 Drawing Sheets

MFP(TRANSMISSION SIDE)
MFP(RECEPTION SIDE)
TRANSMIT DOCUMENT
SAVE
HOLD TRANSMISSION ID HOLD DEVICE ID
HOLD TRANSMISSION ID
HDD
USER HISTORY ACQUISITION REQUEST
RESPONSE
DOCUMENT HISTORY ACQUISITION REQUEST
RESPONSE
USER HISTORY ACQUISITION REQUEST
RESPONSE
DOCUMENT HISTORY ACQUISITION REQUEST
RESPONSE
REGULAR INTERVALS
POLLING

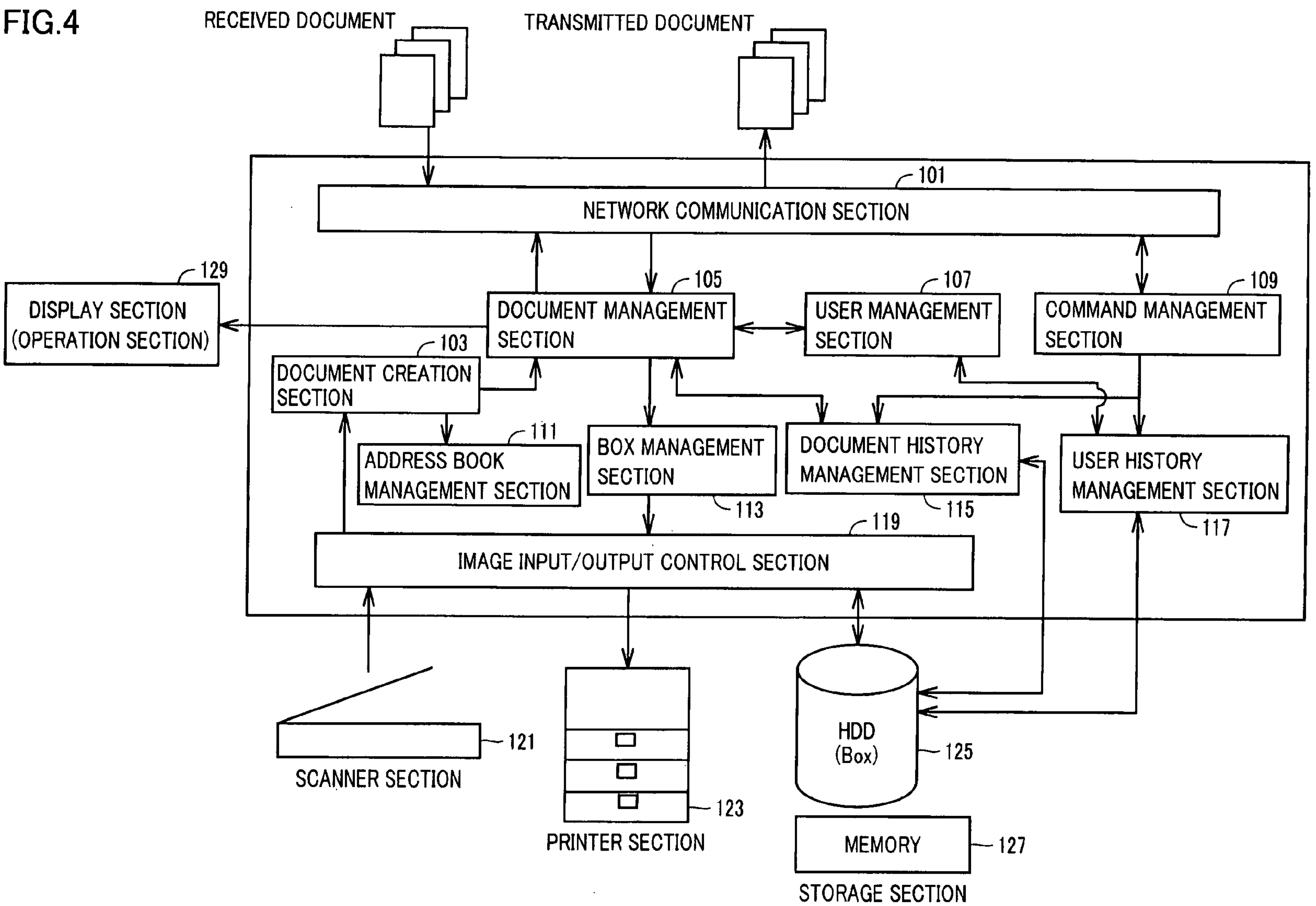
FIG.4
RECEIVED DOCUMENT
TRANSMITTED DOCUMENT
101
NETWORK COMMUNICATION SECTION
129
DISPLAY SECTION (OPERATION SECTION)
105
DOCUMENT MANAGEMENT SECTION
107
USER MANAGEMENT SECTION
109
COMMAND MANAGEMENT SECTION
103
DOCUMENT CREATION SECTION
111
ADDRESS BOOK MANAGEMENT SECTION
BOX MANAGEMENT SECTION
113
DOCUMENT HISTORY MANAGEMENT SECTION
115
USER HISTORY MANAGEMENT SECTION
117
119
IMAGE INPUT/OUTPUT CONTROL SECTION
121
SCANNER SECTION
123
PRINTER SECTION
HDD (Box)
125
MEMORY
127
STORAGE SECTION

FIG.5

| USER ID | USER NAME | LOGIN TIME | ACCESSED DOCUMENT ID | DETAILS OF OPERATION |
|---|---|---|---|---|
| 2005 | Iwaki | 2005/10/1 13:00 | 4589093 | Print |
| 2005 | Iwaki | 2005/10/1 14:00 | 4589094 | Send |
| 2005 | Iwaki | 2005/10/2 14:00 | 4589099 | Get |
| 2006 | Yoshimura | 2005/10/2 13:00 | 4589100 | None |
| 2006 | Yoshimura | 2005/10/2 15:00 | 4589200 | Delete |
| | | | | |

FIG.6

| DOCUMENT ID | USER NAME | DOCUMENT NAME | TRANSMISSION ID | TRANSMISSION-SIDE DEVICE ID | DETAILS OF OPERATION |
|---|---|---|---|---|---|
| 500000 | Iwaki | ****.pdf | 1000 | 40005 | AutoDelete |
| 500001 | Iwaki | ****.pdf | 1005 | 40005 | AutoDelete |
| 500002 | Iwaki | ****.pdf | 1009 | 40005 | AutoDelete |
| 500003 | Iwaki | ****.pdf | 1010 | 40006 | AutoDelete |
| 500004 | Iwaki | ****.pdf | 1015 | 40005 | Print |
| 500005 | Iwaki | ****.pdf | 1010 | 40007 | Get |

FIG.7

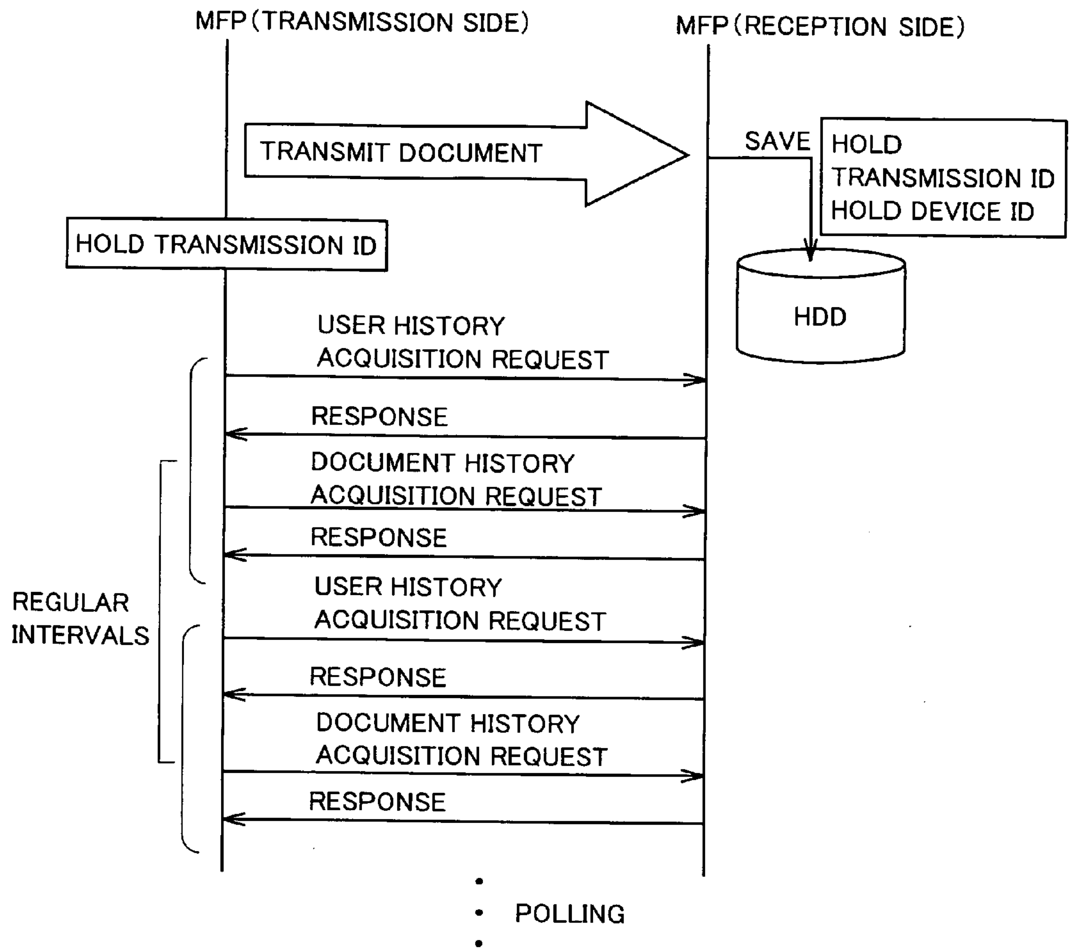

FIG.8

COMMAND

```
<GetDocumentRecieveLog>
 <RequiredUserInfo>
  <User>Murakami</User>
  <Password>aaaa</Password>
 </RequiredUserInfo>
 <SpecifiedDocumentLog>
  <UserName>Iwaki</UserName>
  <ID>1000</ID>
 </SpecifiedDocument>
 <SpecifiedUserLog>
  <UserName>Iwaki</UserName>
 </SpecifiedUser>
</GetDocumentRecieveLog>
```

COMMAND NAME

REQUESTED USER INFORMATION/DEVICE INFORMATION

DESIGNATION OF DOCUMENT BY RECEIVER WHO WANTS TO ACQUIRE DOCUMENT

OPERATION INFORMATION OF RECEIVER WHO WANTS TO ACQUIRE DOCUMENT

FIG.9

RESPONSE

<GetDocumentRecieveLogResponse> RESPONSE NAME
<Result>Ack</Result> COMMAND RESULT
<DocumentLogInfo>
<UserName>Iwaki</UserName> RECEPTION-SIDE USER NAME
<ID>1000</ID> ID ISSUED UPON TRANSMISSION
<Name>xxxxx.pdf</Name> FILE NAME
<Status>Deleted</Status> DOCUMENT STATUS
<Details>Automatic</Details> DETAILS OF DOCUMENT STATUS
<AccessStatus>False</AccessStatus> ACCESS INFORMATION
</DocumentLogInfo>
<UserLogInfo>
<LoginTime>2005/10/4 23:30<LoginTime> LOGIN TIME OF RECEPTION-SIDE USER
<LoginTime>2005/10/5 23:30<LoginTime>
<LoginTime>2005/10/6 23:30<LoginTime>
<LoginTime>2005/10/7 23:30<LoginTime>
</UserLogInfo>
</GetDocumentRecieveLogResponse>

INFORMATION ABOUT DESIGNATED DOCUMENT

MFP ACCESS INFORMATION ABOUT DESIGNATED USER

FIG.10

LIST OF TRANSMISSION JOBS

| TRANSMISSION ID | FILE NAME | RECEPTION SIDE | TRANSMISSION RESULT | RECEPTION STATE |
|---|---|---|---|---|
| No1 | Aaa.pdf | Mr./Ms. IWAKI | OK | UNREAD |
| No2 | Bbb.pdf | Mr./Ms. YOSHIMURA | OK | OK |
| No3 | ccc.pdf | HUMAN RESOURCE DEPARTMENT | OK | UNREAD/ DELETE |

DETAIL

FIG.11

INDICATE DETAILED INFORMATION OF RECEIVER OF No. 1

—Mr./Ms. IWAKI DOES NOT ACCESS MFP XXXXX FOR ONE WEEK.

—DESIGNATED TRANSMISSION DOCUMENT IS DELETED AUTOMATICALLY.

—SECOND RETRANSMISSION IS SUCCESSFUL.

—AUTOMATICALLY DELETE AFTER ONE WEEK IF NO ACCESS.

OK

IMAGE FORMING DEVICE CAPABLE OF TRANSMITTING DOCUMENT TO ANOTHER DEVICE

This application is based on Japanese Patent Application No. 2006-187015 filed with the Japan Patent Office on Jul. 6, 2006, the entire content of which is hereby incorporated by reference.

BACKGROUND OF THE INVENTION

1. Field of the Invention

The present invention relates to an image forming device, a control method of the image forming device, and a control program for the image forming device. In particular, the present invention relates to an image forming device capable of transmitting a document to another device, a control method of the image forming device, and a control program for the image forming device.

2. Description of the Related Art

Conventionally, a network image formation system is configured by a connection of a plurality of image forming devices (such as MFPs (Multi Function Peripherals) on a network. Each image forming device includes a storage unit such as an HDD (Hard Disk Drive), and the storage unit can save documents including image data obtained by scanning, data created by application software, and the like. Further, each image forming device can transmit/receive document data to/from a designated address.

Data received by an image forming device is saved in a user's box indicated by an address. The box refers to a data storage space provided for each user in an HDD.

The box has a limited capacity; therefore, it is considered that a function of automatically deleting data after a lapse of a predetermined saving period of time is provided for the box.

However, if the box has such an automatic deletion function, there is a possibility that an unread document is deleted. As a result, it is impossible to send a document to a receiver with reliability (there is occurred erroneous communication between a transmitter and a receiver).

In relation to such a technique, Japanese Laid-Open Patent Publication No. 11-321046 discloses the following method. That is, if a job before printout is deleted, a printing device transmits a job retransmission request to a host device and, then, the host device retransmits job data to the printing device. According to this method, it is possible to print out retransmitted data.

Japanese Laid-Open Patent Publication No. 2000-330737 discloses a printing device capable of allowing a transmitter of a print job to be cancelled to recognize that the print job will be deleted, and capable of notifying the transmitter of necessity that a print job must be retransmitted.

Japanese Laid-Open Patent Publication No. 2003-323276 discloses a job management method of discriminating a print job printed out normally and, then, registered as a job log in a printing device and a print job having a possibility of retransmission, and deleting an unnecessary print job with reliability.

Japanese Laid-Open Patent Publication No. 11-306062 discloses a network system where a plurality of clients can access rewritable optical disc drives connected thereto via a server. Herein, the server manages a saving period of time of data to be recorded on an optical disc peculiar to a corresponding client, and automatically deletes unnecessary data in association with the management.

In order to solve the problems about automatic data deletion, it is considered that the following processes: (1) an unread document is not deleted, and (2) a reception-side device makes an inquiry whether a received document is deleted to a transmission-side device, must be performed.

However, if the method (1) is adopted, there arises a problem that if all saved documents are unread, a document cannot be newly received.

On the other hand, if the method (2) is adopted, there arises a problem that both the reception-side device and the transmission-side device must have a control function of confirming whether or not data is deleted. In addition, there arises a problem that the reception-side device cannot make an inquiry if the transmission-side device is turned off.

As described above, both the methods (1) and (2) have a problem that reduction in erroneous communication and reduction in capacitive load of a box are not achieved together.

SUMMARY OF THE INVENTION

The present invention is devised in order to solve the aforementioned problems. An object of the present invention is to provide an image forming device capable of efficiently transmitting a document, a control method of the image forming device, and a control program for the image forming device.

In order to achieve this object, according to one aspect of the present invention, an image forming device includes: a transmission section transmitting a document to a reception-side device; a storage section storing the transmitted document; an acquisition section acquiring a status of the transmitted document from the reception-side device; and a retransmission section retransmitting the document stored in the storage section in accordance with the status acquired by the acquisition section when the document is deleted while being unread in the reception-side device.

According to another aspect of the present invention, a control method of an image forming device includes: a transmission step of transmitting a document to a reception-side device; a storage step of storing the transmitted document; an acquisition step of acquiring a status of the transmitted document from the reception-side device; and a retransmission step of retransmitting the document stored in the storage step in accordance with the status acquired in the acquisition step when the document is deleted while being unread in the reception-side device.

According to still another aspect of the present invention, a control program for an image forming device allows a computer to execute: a transmission step of transmitting a document to a reception-side device; a storage step of storing the transmitted document; an acquisition step of acquiring a status of the transmitted document from the reception-side device; and a retransmission step of retransmitting the document stored in the storage step in accordance with the status acquired in the acquisition step when the document is deleted while being unread in the reception-side device.

According to the present invention, if a document is deleted while being unread in a reception-side device, such a document can be retransmitted. Therefore, it is possible to provide an image forming device capable of efficiently transmitting a document, a control method of the image forming device, and a control program for the image forming device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows a configuration of an MFP.

FIG. 5 shows a specific example of data recorded in a user history management section 117 shown in FIG. 4.

FIG. 6 shows a specific example of data recorded in a document history management section 115 shown in FIG. 4.

FIG. 7 shows a sequence that a transmission-side MFP traces a document of a reception-side MFP.

FIG. 8 shows a command regularly transmitted from a transmission-side MFP to a reception-side MFP.

FIG. 9 shows a response sent from a reception-side MFP to a transmission-side MFP.

FIG. 10 shows a screen displaying a list of transmission jobs on an operation panel of a transmission-side MFP.

FIG. 11 shows a state that a file of No. 1 shown in FIG. 10 is selected and, then, a “Detail” button is pressed.

DESCRIPTION OF THE PREFERRED EMBODIMENTS

Figure 1:
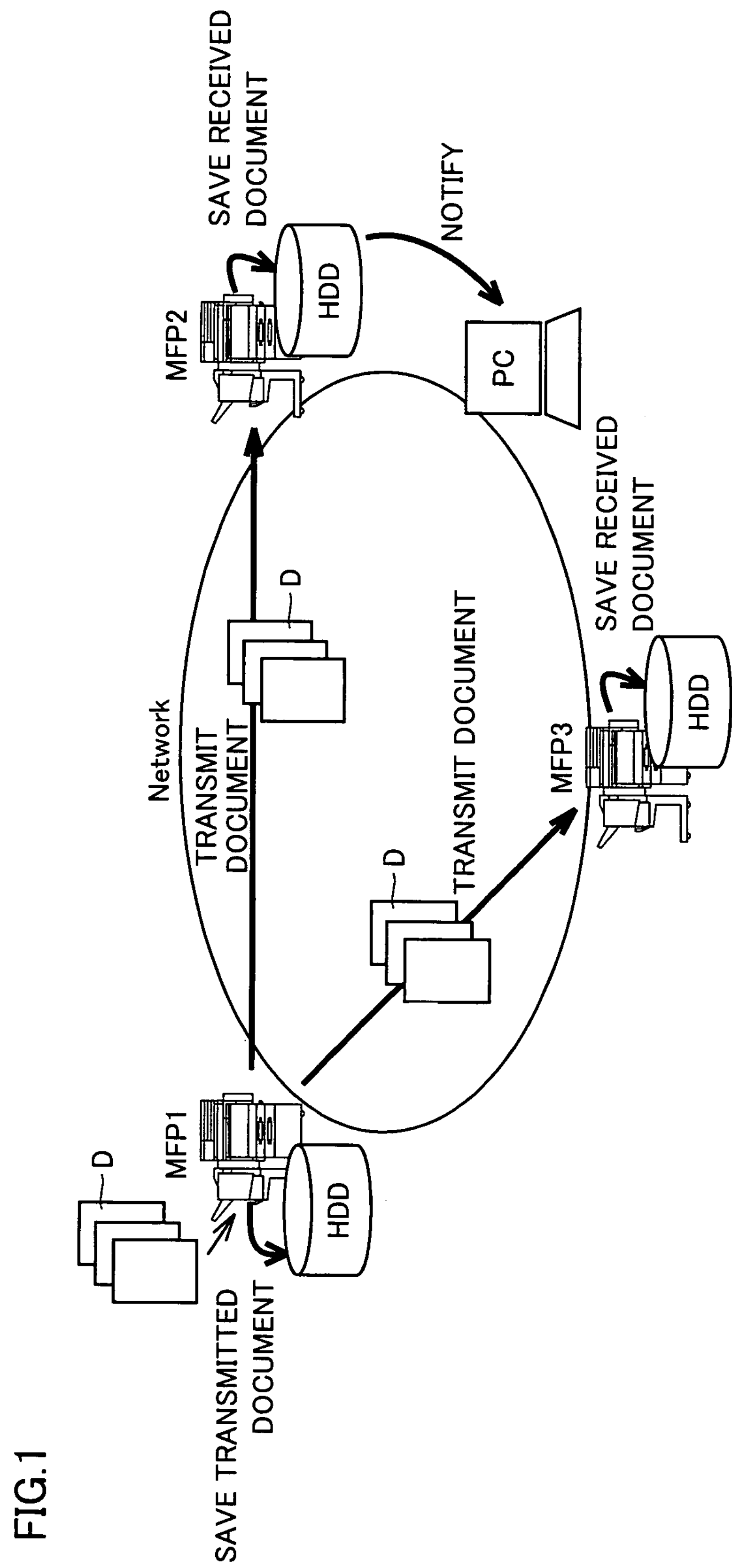
FIG. 1 shows a configuration of a network image formation system according to one embodiment of the present invention.

With reference to FIG. 1, a network image formation system is configured by a plurality of MFPs 1 to 3 connected to each other on a network. Each MFP includes an HDD saving a document in a box for each user. Document data is transmitted from one MFP to another MFP. For example, if MFP 1 transmits document data D to MFP 2 and MFP 3, an HDD of MFP 1 saves document data D for a predetermined period of time. In each of MFP 2 and MFP 3, received document data D is saved in a box designated by MFP 1. A user may receive notification that a corresponding MFP receives data through a PC connected to the network.

The received document data saved in the HDDs of MFPs 2 and 3 can be deleted by a reception-side user or can be automatically deleted after a lapse of a preset period of time.

Even when received document data is unintentionally deleted or automatically deleted, the network image formation system automatically detects deletion of the data and determines whether or not the data must be retransmitted based on information such as a job history; thus, automatic retransmission of an unread document becomes possible. In this embodiment, a transmission-side MFP acquires information about a reception-side MFP, and appropriately determines whether or not data must be retransmitted.

Figure 2:
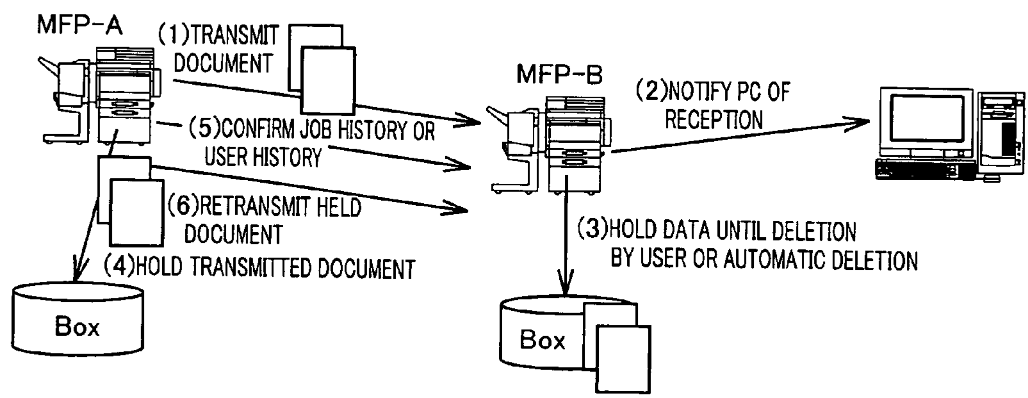
FIG. 2 shows a procedure for transmitting a document.

FIG. 2 shows a procedure for transmitting a document.

With reference to the figure, when a user (transmission-side user) operates an MFP-A to thereby transmit a document to a specific user (reception-side user) having an MFP-B ((1) in the figure), the MFP-B notifies a PC of the reception-side user of reception of the document ((2) in the figure). The document is saved in a box for the reception-side user, and is held by the box until deletion by the reception-side user or automatic deletion ((3) in the figure).

The transmitted document is also saved in a box for the transmission-side user in the MFP-A ((4) in the figure). At predetermined timing, the MFP-A confirms a job history and a user history in the MFP-B ((5) in the figure). If the transmitted document is deleted while being unread, the document saved in the MFP-A is automatically retransmitted to the MFP-B.

This process allows the reception-side user to read the document with reliability.

Herein, retransmission timing of the document may be determined based on information obtained when the reception-side user has logged in. A fact of retransmission may be stated in a file name of a document file upon retransmission. Alternatively, the transmission-side user may notify the reception-side user of the fact of retransmission.

In (1) in the figure, if a document is transmitted to a plurality of users simultaneously, the aforementioned retransmission is performed for a user who deletes the document while being unread. Herein, the document saved in the MFP-A is automatically deleted after confirmation that all users have outputted (read) the document.

Figure 3:
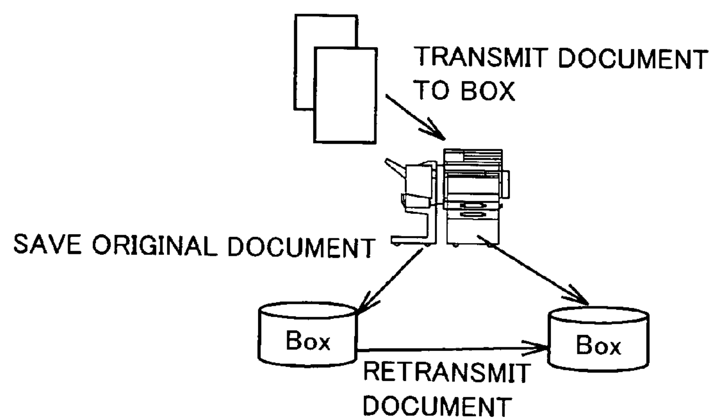
FIG. 3 shows a case that a document is transmitted from one box to another box in an MFP.

FIG. 2 shows an example that a document is transmitted from one MFP to another MFP. However, as shown in FIG. 3, the present invention can be effected also in a case that a document is transmitted from one box to another box in an MFP. More specifically, a document is saved in a transmission-side box upon transmission of the document to a reception-side box and, then, is retransmitted at predetermined timing under predetermined conditions.

FIG. 4 shows a configuration of an MFP.

With reference to the figure, the MFP includes a network communication section 101 controlling network communication and performing document transmission/reception, a document creation section 103 creating a document from data obtained by scanning and the like, a document management section 105 managing a transmitted/received document, a user management section 107 managing a user, a command management section 109 managing a command, an address book management section 111 managing a reception-side address of a document, a box management section 113 managing a box for each user, a document history management section 115 managing a document history, a user history management section 117 managing a user history, an image input/output control section 119 controlling image input/output, a scanner section 121 scanning an original to thereby obtain image data, a printer section 123 forming an image on a sheet of paper, an HDD 125 including a plurality of boxes, and a memory 127 forming a storage region.

Document creation section 103 creates a document from data scanned by scanner section 121 through image input/output control section 119, and transfers the created document to document management section 105. Document management section 105 transmits the document through network communication section 101 if necessary. Alternatively, document management section 105 allows box 125 to save the document through box management section 113 and image input/output control section 119. Document history management section 115 receives and manages a history of operations performed for the document by document management section 105.

The history such as communication with another MFP through command management section 109 and network communication section 101, details acquired from the command, and the user operation history and details thereof each managed by user management section 107 are appropriately sorted and, then, are managed by and stored in user history management section 117 and document history management section 115.

According to the configuration shown in FIG. 4, the MFP can save a transmitted/received document and manage a document for each user. Each of document history management section 115 serving as a module for managing a document history and user history management section 117 serving as a module for managing a user history has a mechanism for sending data provided with information to a command transmitted via the network.

An MFP on a transmission side has a mechanism (command management section 109) for issuing a command for making an inquiry of information to an MFP on a reception side, if necessary. An MFP further has a function of automatically deleting a document in a box in accordance with a configuration thereof.

FIG. 5 shows a specific example of data recorded in user history management section 117 shown in FIG. 4.

As shown in the figure, there are recorded, as an operation history of an MFP by a user, an ID of a user using a device, a name of the user, a login time, an ID of an accessed document, details of operations (e.g., print, document transmission, document acquisition, document deletion).

With this information, it is possible to obtain a fact whether or not a user accesses a specific document, and a login time of the user.

FIG. 6 shows a specific example of data recorded in document history management section 115 shown in FIG. 4.

As shown in the figure, there are recorded, as an operation history of a document, an ID of a document, a user name of the document, a name of the document, a transmission ID, an ID of a reception-side device, and details of operations (e.g., automatic deletion, print, document acquisition, deletion), for each document.

With this information, it is possible to obtain a fact whether a document is automatically deleted, deleted, or outputted (printed out).

FIG. 7 shows a sequence that a transmission-side MFP traces a document of a reception-side MFP.

As shown in the figure, when a transmission-side MFP transmits a document to a reception-side MFP, the reception-side MFP allows a box in an HDD to save the document and holds a transmission ID and a transmission-side device ID. The transmission-side MFP also holds the transmission ID.

At regular time intervals, the transmission-side MFP transmits a signal requesting a saved user history and a saved document history to the reception-side MFP. Based on this signal, the reception-side MFP sends the user history and the document history respectively recorded in user history management section 117 and document history management section 115 to the transmission-side MFP. Thus, the transmission-side MFP can obtain operation information and the like for a transmitted document by a reception-side user.

FIG. 8 shows a command to be regularly transmitted from the transmission-side MFP to the reception-side MFP.

The command contains a name of the command, a name of requested user information or device information, designation of a document by a reception-side user who wants to acquire the document, operation information by the reception-side user who wants to acquire the document.

FIG. 9 shows a response sent from the reception-side MFP to the transmission-side MFP.

The response contains a name of the response, a result of the command, information of the designated document, and MFP access information of a designated user. The information of the designated document contains a name of a reception-side user, an ID upon issuing transmission, a file name, a status of the document, details of the status of the document, and access information. The MFP access information of the designated user contains a login time of a reception-side user.

The command and the response are configured by, for example, document languages such as XML or programming languages such as Java (registered trademark). In order to acquire the job history and the user operation history, a standard command such as MIB may be used.

FIG. 10 shows a screen displaying a list of transmission jobs on an operation panel 129 of the transmission-side MFP.

The screen displaying the list of the transmission jobs functions as a user interface for confirming a state of a transmitted document. More specifically, the screen displays a transmission ID, a name of a transmitted file, a reception-side user, a transmission result, and a reception state. As the reception state, there is displayed information whether a document is unread or deleted based on the user operation history and the document history.

Specifically, if “Print” or “Get”, which is details of an operation by a reception-side user, is recorded in FIG. 5, it is determined that a document concerned is already read. Thus, “OK” is displayed as a communication state in FIG. 10. On the other hand, if “Print” or “Get”, which is details of an operation by a reception-side user, is not recorded in FIG. 5, it is determined that a document concerned is unread. Thus, “Unread” is displayed as a reception state in FIG. 10.

If “AutoDelete”, which is details of an operation for a document concerned, is recorded in FIG. 6, “Unread” and “Delete” are displayed as a reception state in FIG. 10.

FIG. 11 shows a state that a file of No. 1 in FIG. 10 is selected and, then, a “Detail” button is pressed.

Herein, there is displayed detailed information of a document of transmission No. 1. Herein, there are displayed information about a status of accessing an MFP by a reception-side user, information that a transmitted document is automatically deleted, information that the document is retransmitted thereafter, and information about deletion of a retransmitted document.

Figure 12:
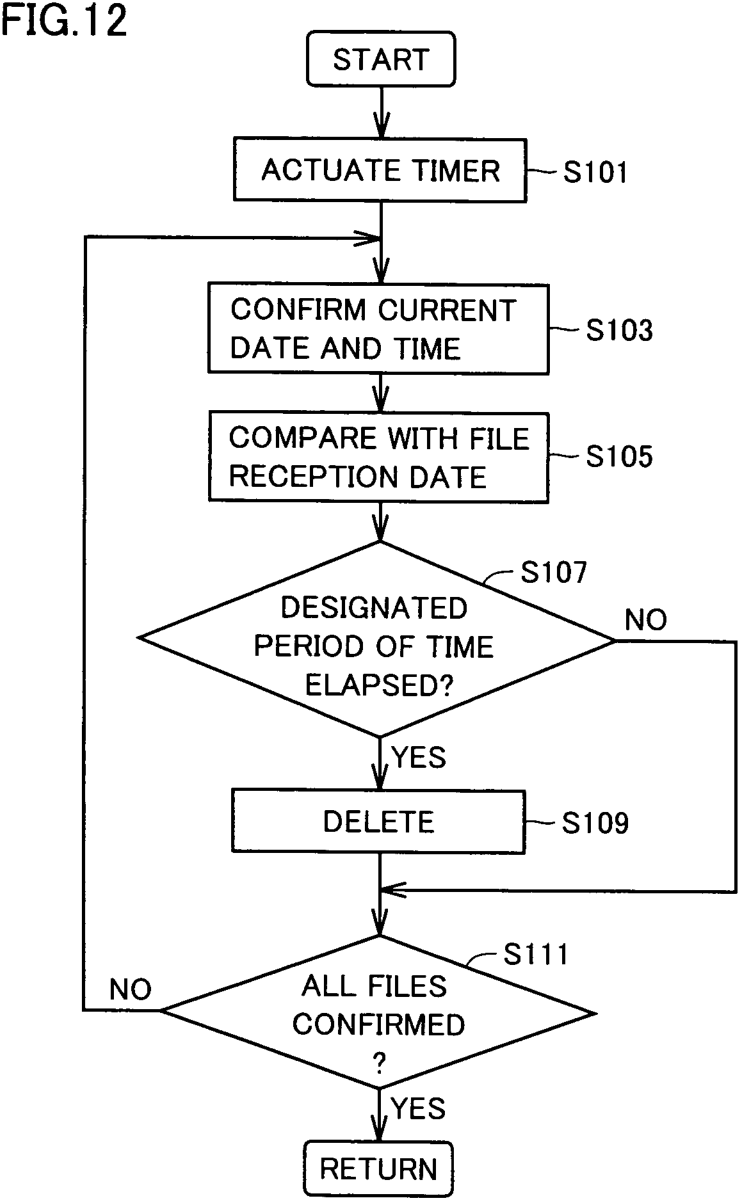
FIG. 12 is a flowchart showing a process, executed by an MFP, for automatically deleting a document saved in a box.

FIG. 12 is a flowchart showing a process, executed by an MFP, for automatically deleting a document saved in a box.

With reference to the figure, in step S101, the MFP actuates a timer. In step S103, the MFP confirms current date and time. In step S105, the MFP compares the confirmed date and time with a document file reception date. In step S107, the MFP determines whether a previously designated period of time is elapsed since reception of the file. If YES, the MFP deletes the file in step S109. In step S111, the MFP determines whether or not all files are conformed. If NO, processing returns to step S103. If YES, the processing ends.

Figure 13:
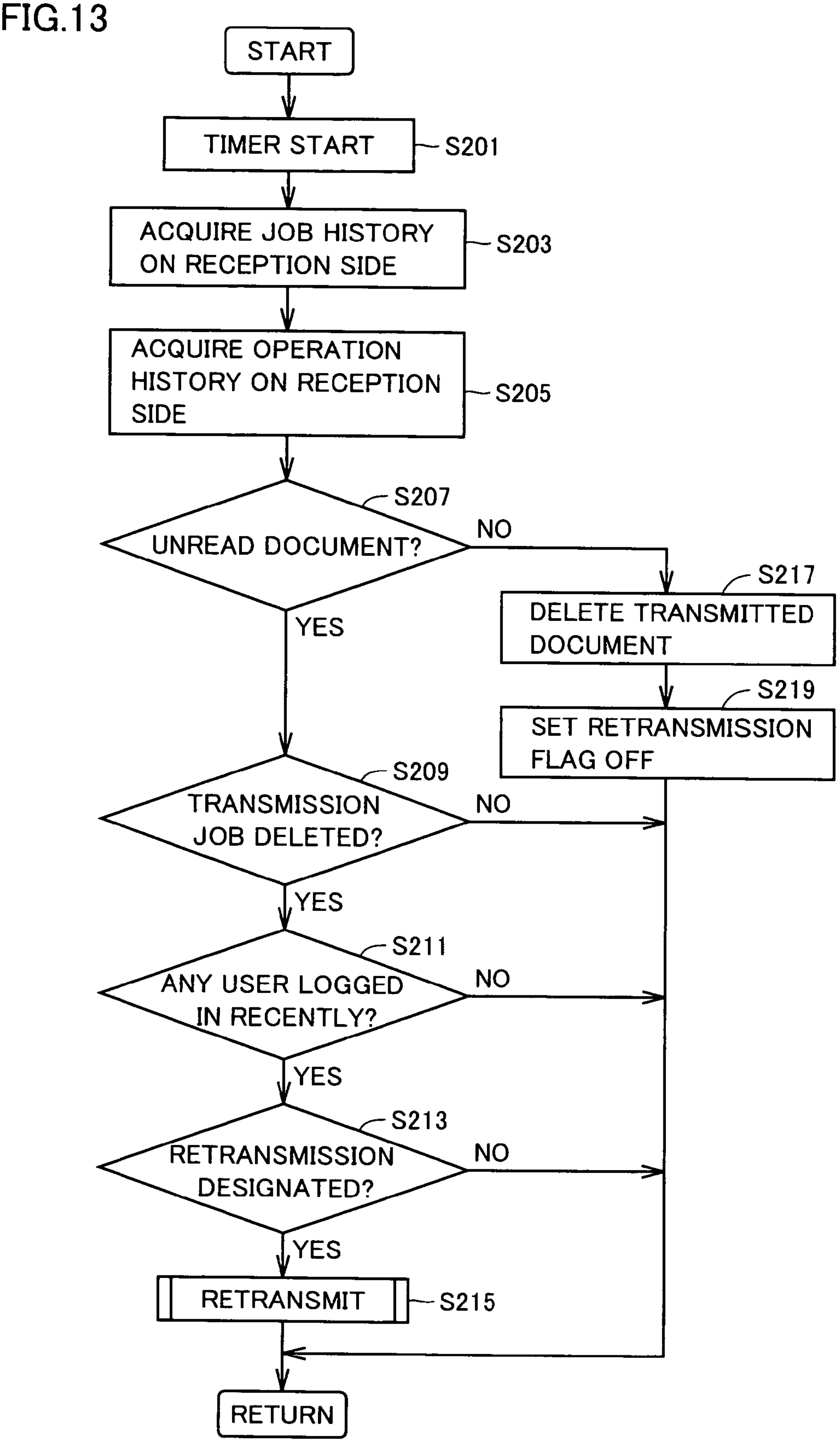
FIG. 13 is a flowchart showing a process, executed by an MFP, for retransmitting a file.

FIG. 13 is a flowchart showing a process, executed by an MFP, for retransmitting a file.

With reference to the figure, in step S201, the MFP actuates a timer. In step S203, the MFP acquires a job history of a reception-side MFP. In step S205, the MFP acquires an operation history of the reception-side MFP.

In step S207, the MFP determines whether or not the reception-side MFP has an unread document. If YES, the MFP determines whether or not a document transmitted by a transmission job is deleted while being unread in step S209. If YES in step S209, the MFP determines whether or not a reception-side user logs in the MFP recently in step S211.

If YES in step S211, the MFP determines whether or not retransmission is designated by the user in step S213. If YES, the MFP retransmits a file in step S215.

Documents other than unread documents in step S207 are deleted from the box of the transmission-side MFP in step S217. In step S219, a retransmission flag is set off. Thus, documents read already are never retransmitted.

If NO in one of steps S209, S211 and S213, the processing ends.

Figure 14:
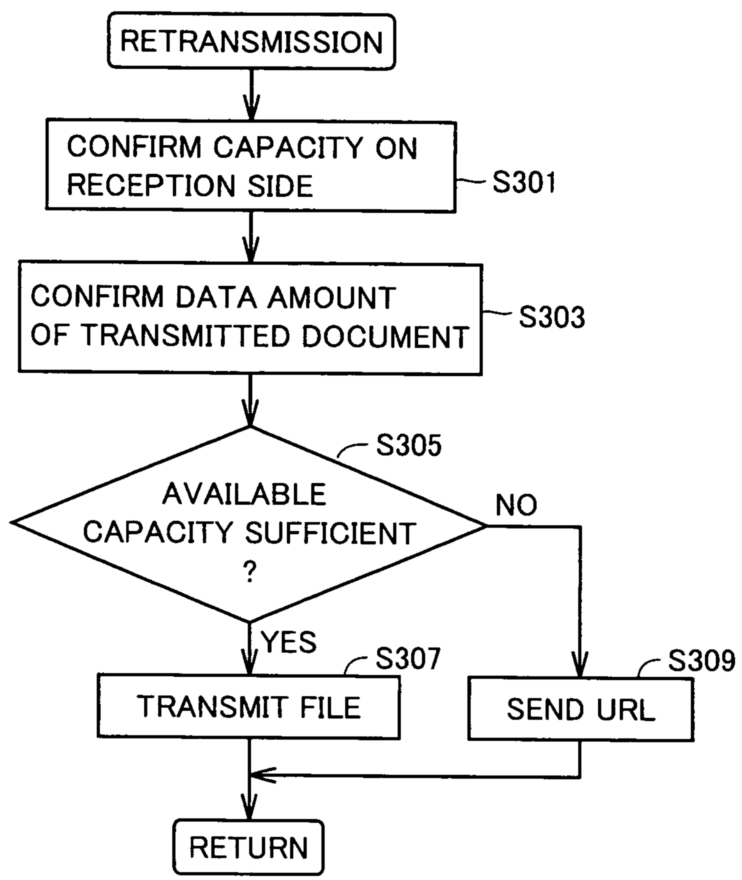
FIG. 14 is a flowchart showing a retransmission process in step S215 shown in FIG. 13.

FIG. 14 is a flowchart showing a retransmission process in step S215 shown in FIG. 13.

With reference to the figure, the MFP confirms a capacity of the box of the reception-side MFP in step S301. In step S303, the MFP confirms a data amount of a document to be retransmitted.

In step S305, the MFP determines whether or not the capacity of the box of the reception-side MFP is sufficient. If YES, the file is retransmitted in step S307. If NO, in order to reduce the data amount, only a URL of a saving place of the document file to be retransmitted is transmitted in step S309. Thus, the user can access the URL.

Determination whether a URL is transmitted or a document file itself is transmitted is made based on information about importance of the document, a job history, a user operation history, a capacity of a storage unit on a reception side, and the like in a comprehensive manner.

The present invention is especially effective at transmitting/receiving a document having a large data amount such as scan data in an image forming device. More specifically, a document having a large data amount is automatically deleted in good time in order to secure a capacity of a storage unit, and countermeasures against this deletion is taken. However, the present invention is applicable to a document created by a PC.

The present invention is applicable to transmission/reception of documents such as image data, data created by an application, text data, an e-mail massage, and the like.

Effects of the Embodiment

In the conventional art, if one image forming device transmits a document to another image forming device, an operation of one image forming device is completed at the time when another image forming device has received the document. Therefore, one image forming device cannot determine how a receiver treats the document thereafter, and cannot automatically retransmit the document in view of a status of the document. However, according to this embodiment, it is possible to automatically retransmit a document in an efficient manner.

In addition, this embodiment has an effect that a file can be retransmitted by judgment on a transmission side without a retransmission request on a reception side. Thus, it is possible to prevent such a situation that even when a retransmission request on a reception side is issued, a device on a transmission side is tuned off, so that retransmission cannot be performed.

This embodiment can adopt a conventionally used device as a reception-side device. Therefore, it is possible to reduce cost for system introduction.

(Others)

The present invention is effected for an image forming device including document transmission devices such as an MFP, a facsimile machine, a copying machine and a PC.

The processing in this embodiment may be executed by software or a hardware circuit.

The present invention may provide a program executing the processing in this embodiment. Further, such a program may be provided to a user while being recorded in a recording medium such as a CD-ROM, a flexible disk, a hard disk, a ROM, a RAM or a memory card. In addition, such a program may be downloaded into a device via a communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming device comprising:

a transmission section transmitting a document to a reception-side device, a copy of said document being stored at said reception-side device;

a storage section storing said document;

an acquisition section acquiring a status of said copy of said document from said reception-side device;

a determination section determining based on said status acquired by said acquisition section whether said copy of said document is automatically deleted before being accessed by a specific user at said reception-side device; and a retransmission section retransmitting said document stored in said storage section to said reception-side device addressing said specific user when said determination section determines that said copy of said document is automatically deleted before being accessed by said specific user at said reception-side device, wherein said acquisition section acquires a document history and a user history, the document history comprises document identification information identifying said copy of said document associated with a user identification information of said specific user, and an operation information identifying whether said copy of said document identified in the document identification information is automatically deleted or not, and the user history includes one or more user identification information identifying one or more users at said reception-side device, a document identification information identifying a document associated with each user identification information, and an operation information identifying whether the user identified by each user identification information accessed the document identified by the associated document identification information.

2. The image forming device according to claim 1, wherein said determination section is configured to determine based on said status acquired by said acquisition section whether said copy of said document is already accessed at said reception-side device; and a deletion section deleting said document stored in said storage section when said determination section determines that said copy of said document is already accessed at said reception-side device.

3. The image forming device according to claim 1, wherein said retransmission section transmits one of said document itself and a URL of said document.

4. The image forming device according to claim 3, wherein said retransmission section determines whether to transmit said document itself or the URL of said document based on a capacity of a storage unit of said reception-side device.

5. The image forming device according to claim 1, wherein said acquisition section performs an acquiring operation by using one of an XML-based command and an MIB-based command.

6. The image forming device according to claim 1, further comprising:

a display section displaying a state of said document.

7. A control method of an image forming device, comprising:

a transmission step of transmitting a document to a reception-side device, a copy of said document being stored at said reception-side device;

a storage step of storing said document;

an acquisition step of acquiring a status of said copy of said document from said reception-side device;

a first determination step of determining based on said status acquired in said acquisition step whether said copy of said document is automatically deleted before being accessed by a specific user at said reception-side device; and a retransmission step of retransmitting said document to said reception-side device addressing said specific user when determined that said copy of said document is automatically deleted before being accessed by said specific user at said reception-side device, wherein said acquisition step includes acquiring a document history and a user history, the document history comprises document identification information identifying said copy of said document associated with a user identification information of said specific user, and an operation information identifying whether said copy of said document identified in the document identification information is automatically deleted or not, and the user history includes one or more user identification information identifying one or more users at said reception-side device, a document identification information identifying a document associated with each user identification information, and an operation information identifying whether the user identified by each user identification information accessed the document identified by the associated document identification information.

8. The control method of an image forming device according to claim 7, further comprising:

a second determination step of determining based on said acquired status whether said copy of said document is already accessed at said reception-side device; and a deletion step of deleting said document when determined that said copy of said document is already accessed at said reception-side device.

9. The control method of an image forming device according to claim 7, wherein said retransmission step transmits one of said document itself and a URL of said document.

10. The control method of an image forming device according to claim 9, wherein said retransmission step further includes determining whether to transmit said document itself or the URL of said document based on a capacity of a storage unit of said reception-side device.

11. The control method of an image forming device according to claim 7, wherein said acquisition step performs an acquiring operation by using one of an XML-based command and an MIB-based command.

12. The control method of an image forming device according to claim 7, further comprising:

a display step of displaying a state of said document.

13. A non-transitory computer readable medium storing a program, the program performing:

a transmission step of transmitting a document to a reception-side device, a copy of said document being stored at said reception-side device;

a storage step of storing said document;

an acquisition step of acquiring a status of said copy of said document from said reception-side device;

a first determination step of determining based on said status acquired in said acquisition step whether said copy of said document is automatically deleted before being accessed by a specific user at said reception-side device; and a retransmission step of retransmitting said document to said reception-side device addressing said specific user when determined that said copy of said document is automatically deleted before being accessed by said specific user at said reception-side device, wherein said acquisition step includes acquiring a document history and a user history, the document history comprises document identification information identifying said copy of said document associated with a user identification information of said specific user, and an operation information identifying whether said copy of said document identified in the document identification information is automatically deleted or not, and the user history includes one or more user identification information identifying one or more users at said reception-side device, a document identification information identifying a document associated with each user identification information, and an operation information identifying whether the user identified by each user identification information accessed the document identified by the associated document identification information.

14. A system comprising a first image forming device and a second image forming device, wherein the first image forming device includes a first storage section configured to store a document, a first transmission section configured to transmit the document to the second image forming device, an acquisition section configured to acquire a status of a copy of the document from the second image forming device, a determination section configured to determine based on the status acquired by the acquisition section whether the copy of the document is automatically deleted before accessed by a specific user at the second image forming device, and a retransmission section configured to retransmit the document stored in the first storage section to the second image forming device addressing said specific user when the determination section determines that the copy of the document is automatically deleted before being accessed by said specific user at the second image forming device, and wherein the second image forming device includes;

a receiving section configured to receive the document transmitted from the first image forming device, a second storage section configured to store the received document as the copy of the document, a deletion section configured to delete the copy of the document stored in the second storage section, and a second transmission section configured to transmit the status of the copy of the document to the first image forming device in response to a request from the first image forming device, wherein the first image forming device acquires a document history and a user history from the second image forming device, the document history comprises document identification information identifying said copy of said document associated with a user identification information of said specific user, and an operation information identifying whether said copy of said document identified in the document identification information is automatically deleted or not, and the user history includes one or more user identification information identifying one or more users at said reception-side device, a document identification information identifying a document associated with each user identification information, and an operation information identifying whether the user identified by each user identification information accessed the document identified by the associated document identification information.

* * * * *